US009330414B2

(12) United States Patent
Bhaowal et al.

(10) Patent No.: US 9,330,414 B2
(45) Date of Patent: May 3, 2016

(54) APPROVAL SYSTEM FOR BUYER-INITIATED REQUISITION MODIFICATIONS

(75) Inventors: Mayukh Bhaowal, Redwood City, CA (US); Suman Guha, Fremont, CA (US); Shibhu Nambiar, Springfield, VA (US); Lee-Hian Quek, Foster City, CA (US); Angela Xian, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 208 days.

(21) Appl. No.: 13/476,445

(22) Filed: May 21, 2012

(65) Prior Publication Data

US 2013/0311338 A1    Nov. 21, 2013

(51) Int. Cl.
*G06Q 30/00*     (2012.01)
*G06Q 30/06*     (2012.01)
*G06Q 30/04*     (2012.01)

(52) U.S. Cl.
CPC ............ *G06Q 30/0637* (2013.01); *G06Q 30/04* (2013.01); *G06Q 30/06* (2013.01)

(58) Field of Classification Search
CPC ............. G06Q 20/204; G06Q 30/02–30/0645; G06Q 30/08
USPC .......................... 705/14.1–14.73, 26.1–27.2
See application file for complete search history.

(56) References Cited

U.S. PATENT DOCUMENTS

| 5,319,542 A | 6/1994 | King, Jr. et al. |
|---|---|---|
| 6,910,018 B1 | 6/2005 | Okada et al. |
| 7,117,165 B1 * | 10/2006 | Adams ................ G06Q 10/00 705/26.4 |
| 7,350,698 B2 | 4/2008 | Viswanath et al. |
| 7,672,853 B2 | 3/2010 | Gune et al. |
| 7,676,407 B2 | 3/2010 | De Van et al. |
| 2003/0097316 A1 | 5/2003 | Dunbar et al. |

(Continued)

FOREIGN PATENT DOCUMENTS

EP      1469407 A1      10/2004

OTHER PUBLICATIONS

Ek, R. (2011). Advance Planning Document Process. Policy & Practice, 69(1), 29. Retrieved from http://search.proquest.com/docview/853284803?accountid=14753.*

(Continued)

*Primary Examiner* — Resha Desai
*Assistant Examiner* — Alex Wolcott
(74) *Attorney, Agent, or Firm* — Kilpatrick Townsend & Stockton LLP

(57) ABSTRACT

A method of modifying a requisition within approval and budgetary constraints by a procurement organization may include receiving the requisition from a requesting organization, where the requisition may comprise one or more lines, each having been approved by the requesting organization. The method may also include receiving a change to be applied to a first line associated with a first budget allocation, where the change may be received from a buyer in the procurement organization, and the change may be associated with a second budget allocation. The method may additionally include determining that the change violates a threshold, sending the change to the requesting organization for a second approval, receiving, from the requesting organization, an indication as to whether the second approval is granted, and creating a purchase order based on the indication as to whether the second approval is granted.

20 Claims, 7 Drawing Sheets

(56) References Cited

U.S. PATENT DOCUMENTS

| | | | |
|---|---|---|---|
| 2004/0078254 A1* | 4/2004 | Piechl et al. | 705/7 |
| 2005/0216375 A1* | 9/2005 | Grendel et al. | 705/28 |
| 2007/0073758 A1* | 3/2007 | Perry et al. | 707/102 |
| 2007/0179790 A1 | 8/2007 | Leitch et al. | |
| 2008/0046421 A1* | 2/2008 | Bhatia et al. | 707/5 |
| 2008/0071623 A1 | 3/2008 | Cheng et al. | |
| 2008/0167926 A1* | 7/2008 | Boss et al. | 705/7 |
| 2008/0195506 A1 | 8/2008 | Koretz et al. | |
| 2009/0037236 A1* | 2/2009 | Miller et al. | 705/7 |
| 2011/0153458 A1 | 6/2011 | Wong et al. | |
| 2012/0084090 A1* | 4/2012 | Woodard et al. | 705/1.1 |

OTHER PUBLICATIONS

Karen, A. D. (2000). Strategic buys. Manufacturing Systems, 18(8), 64-70. Retrieved from http://search.proquest.com/docview/205960822?accountid=14753.*

Author Unknown, "How To: Approve or Reject a Purchase Requisition," Stanford University, 2011, [retrieved on Aug. 2, 2012], 1 page. Retrieved from: http://www.stanford.edu/group/fms/fingate/finsystem/iprocure/howto/approve_purchase_req.html.

Author Unknown, "Procurement with Purchase Requisition and Approval Workflow," SAP, date unknown, [retrieved on Aug. 2, 2012], 1 page. Retrieved from: http://help.sap.com/bp_ps603/BBLibrary/HTML/377_EN_CA.htm.

* cited by examiner

APPROVAL SYSTEM FOR BUYER-INITIATED REQUISITION MODIFICATIONS

BACKGROUND

Modern organizations are typically very large and may include many sub-organizations. Each sub-organization may need to make purchases of capital equipment, inventory, supplies, and/or the like. Because most modern organizations may be required to track financial expenditures according to product, department, project, account, etc., individual departments may not be best suited to make these types of purchases without using a formal process. In order to facilitate purchases from a number of different departments, modern organizations may use a specialized procurement department that is tasked with creating formal purchase orders for the organization.

Accordingly, sub-organizations may create product and/or service requests in the form of a requisition. The requisition may contain multiple items and/or services that are required by a sub-organization. The requisition may then be sent to the procurement organization. The procurement organization may be specially qualified to take advantage of contractual arrangements in order to gain a financial advantage in the transaction. Therefore, the procurement organization may convert each line in a requisition into one or more purchase orders.

BRIEF SUMMARY

In one embodiment, a method of modifying a requisition within approval and budgetary constraints by a procurement organization is presented. The method may include receiving, by a computer system of the procurement organization, the requisition from a computer system of a requesting organization. In one embodiment, the requisition may comprise one or more lines, and each of the one or more lines may have been approved by the requesting organization. The method may also include receiving a change to be applied to a first line in the one or more lines. In one embodiment, the first line may be associated with a first budget allocation, the change may be received from a buyer in the procurement organization, and the change may be associated with a second budget allocation that is different than the first budget allocation. The method may additionally include determining that the change violates a threshold, and sending the change to the computer system of the requesting organization for a second approval. The method may further include receiving, from the computer system of the requesting organization, an indication as to whether the second approval is granted, and creating a purchase order based on the indication as to whether the second approval is granted.

In various aspects, the method may also include determining that the second approval is not granted, wherein the purchase order includes at least one of the one or more lines that are not affected by the change, and recording, in a document history log, information comprising the first budget allocation, the second budget allocation, and the indication as to whether the change is approved. The method may additionally include causing to be allocated, in a computer system of a financial department, the second budget allocation according to encumbrance accounting procedures, accessing a configuration, and determining, according to the configuration, whether the change should be allowed.

In one embodiment, the change may be approved based on an approval from a member of the requesting organization who was requested the first line, and an approval from an authority that originally approved the first line. The threshold may comprise a maximum cost increase between the first budget allocation and the second budget allocation. The threshold may comprise a type of product for purchase associated with the first line. The change may comprise substituting a comparable product for a product specified by the first line. The change may comprise adjusting a quantity of products associated with the first line. The change may comprise changing a supplier associated with the first line. The threshold may be received from the computer system of the requesting organization. The computer system of the requesting organization may be separate from the computer system of the procurement organization.

In another embodiment, a computer-readable memory is presented. The computer-readable memory may have stored thereon a sequence of instructions which, when executed by one or more processors, causes the one or more processors to modify a requisition within approval and budgetary constraints by a procurement organization by receiving the requisition from a computer system of a requesting organization, where the requisition may comprise one or more lines, and each of the one or more lines may have been approved by the requesting organization. The one or more processors may also operate by receiving a change to be applied to a first line in the one or more lines, where the first line may be associated with a first budget allocation, the change may be received from a buyer in the procurement organization, and the change may be associated with a second budget allocation that is different than the first budget allocation. The one or more processors may additionally operate by determining that the change violates a threshold, and sending the change to the computer system of the requesting organization for a second approval. The one or more processors may further operate by receiving, from the computer system of the requesting organization, an indication as to whether the second approval is granted; and creating a purchase order based on the indication as to whether the second approval is granted.

In yet another embodiment, a system is presented. The system may include one or more processors and a memory communicatively coupled with and readable by the one or more processors and having stored therein a sequence of instructions which, when executed by the one or more processors, cause the one or more processors to modify a requisition within approval and budgetary constraints by a procurement organization by receiving the requisition from a computer system of a requesting organization, where the requisition may comprise one or more lines, and each of the one or more lines may have been approved by the requesting organization. The one or more processors may also operate by receiving a change to be applied to a first line in the one or more lines, where the first line may be associated with a first budget allocation, the change may be received from a buyer in the procurement organization, and the change may be associated with a second budget allocation that is different than the first budget allocation. The one or more processors may additionally operate by determining that the change violates a threshold, and sending the change to the computer system of the requesting organization for a second approval. The one or more processors may further operate by receiving, from the computer system of the requesting organization, an indication as to whether the second approval is granted; and creating a purchase order based on the indication as to whether the second approval is granted.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
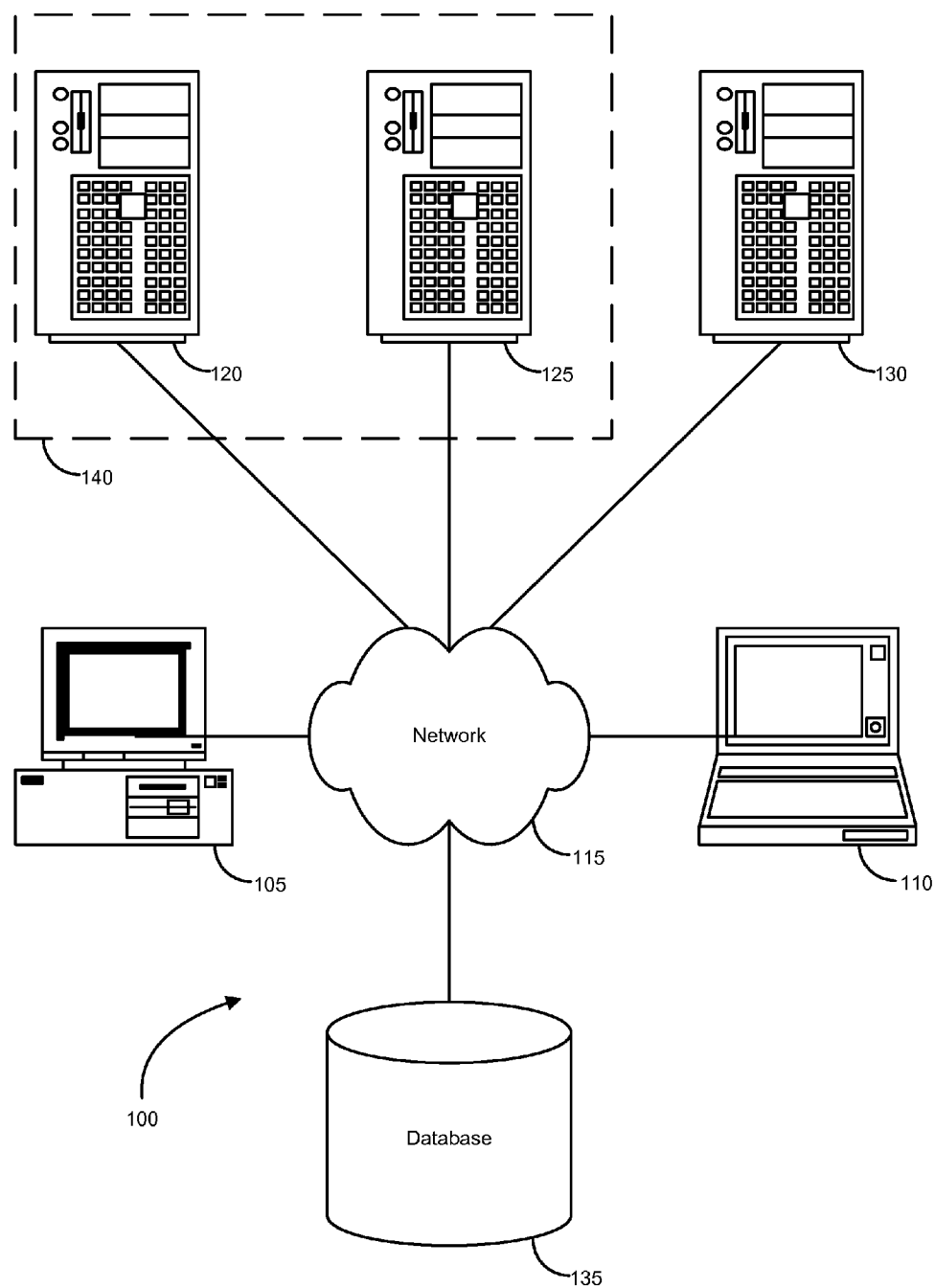
FIG. 1 illustrates a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein are embodiments for a system allowing a buyer in procurement organization to modify a requisition. The requisition may have multiple lines, with each line relating to product and/or service that has been approved. The products and services may be requested by a member of the requesting organization. The approval may be managerial. The approval may also be financial if budgetary controls are in place. In other words, a financial organization may approve each line on a requisition to make sure that the budget is available to fulfill the resulting requisition. If encumbrance accounting procedures are enforced, then an allocation in a budget corresponding to the cost of the products in the requisition may be recorded in an accounting subledger.

When a requisition is received by the procurement organization, the buyer may need to make changes to line items within the requisition. For example, the requester may have indicated a preference for a certain brand or model of the product, and the buyer may determine that financial advantages may be gained by selecting a substitute product from an alternate brand or supplier. The buyer may also change the quantity of the order to take advantage of bulk purchasing arrangements.

Prior to this disclosure, buyers in procurement organizations were limited in how they could change a requisition. Because requisitions had already been approved, and budgets had already been allocated, a buyer typically could not alter requisitions to significantly change the cost of the order. Requesters and other types of employees are typically not trained to use the full functionality of a procurement computer system, so even though they may have the most knowledge as to product requirements, they are typically not allowed to generate purchase orders by themselves. In contrast, buyers in procurement organizations are typically fully trained on the computer systems of the procurement organizations, and typically understand financial and contractual arrangements that the enterprise may have with suppliers.

In the rare instance where a buyer was allowed to make a change to requisition, there was no mechanism by which the change could be resubmitted to a formal approval process.

Therefore, this process could not be automated and was laden with errors that were propagated through the financial system. Managers and buyers lacked a consistent review and approval process for changes made by the buyer, and the requester was unable to track the progress of the requisition or approved purchase order. Allowing ad hoc changes by buyer without a formal process in place could violate strict audit requirements and would fail to abide by encumbrance accounting procedures that exist in publicly funded organizations.

In contrast, embodiments disclosed herein established a method and system for allowing buyers to initiate changes in a requisition that are formally routed through the review and approval process. This may save time and effort on the part of the enterprise because the buyer is typically more informed about changes that need to be made in order to provide a financial advantage to the enterprise. At the same time, requesters and managers in requesting organizations are apprised of the status of the requisition, and are allowed a measure of control over changes made to the requisition by the buyer. Furthermore, the review and approval process may include the financial aspects of the transactions such that budgetary controls may be enforced effectively and encumbrance accounting procedures may be properly followed.

Generally, the embodiments used herein may apply to an Enterprise Resource Planning (ERP) software system. A top level organization using the ERP system may be referred to herein as an enterprise. This may correspond to a company, a corporation, or any other type of organization with sub-organizations. Some of the sub-organizations existing within the enterprise may include a requesting organization, characterized as an organization requesting the items and/or services listed in a requisition. The enterprise may also include a procurement organization that includes buyers who are trained to convert requisitions into formal purchase orders. The enterprise may further include a financial organization that includes employees, such as accountants and data entry clerks, who enforce budgetary controls and encumbrance accounting procedures for the enterprise. Each of these organizations may use a computer system to run portions of the ERP software system. Each part of the ERP system running on the computer systems may be viewed as a separate software product. Alternatively, each system may use a part of one or more integrated software solutions.

Each of the embodiments disclosed herein may be implemented in a computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents.

Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
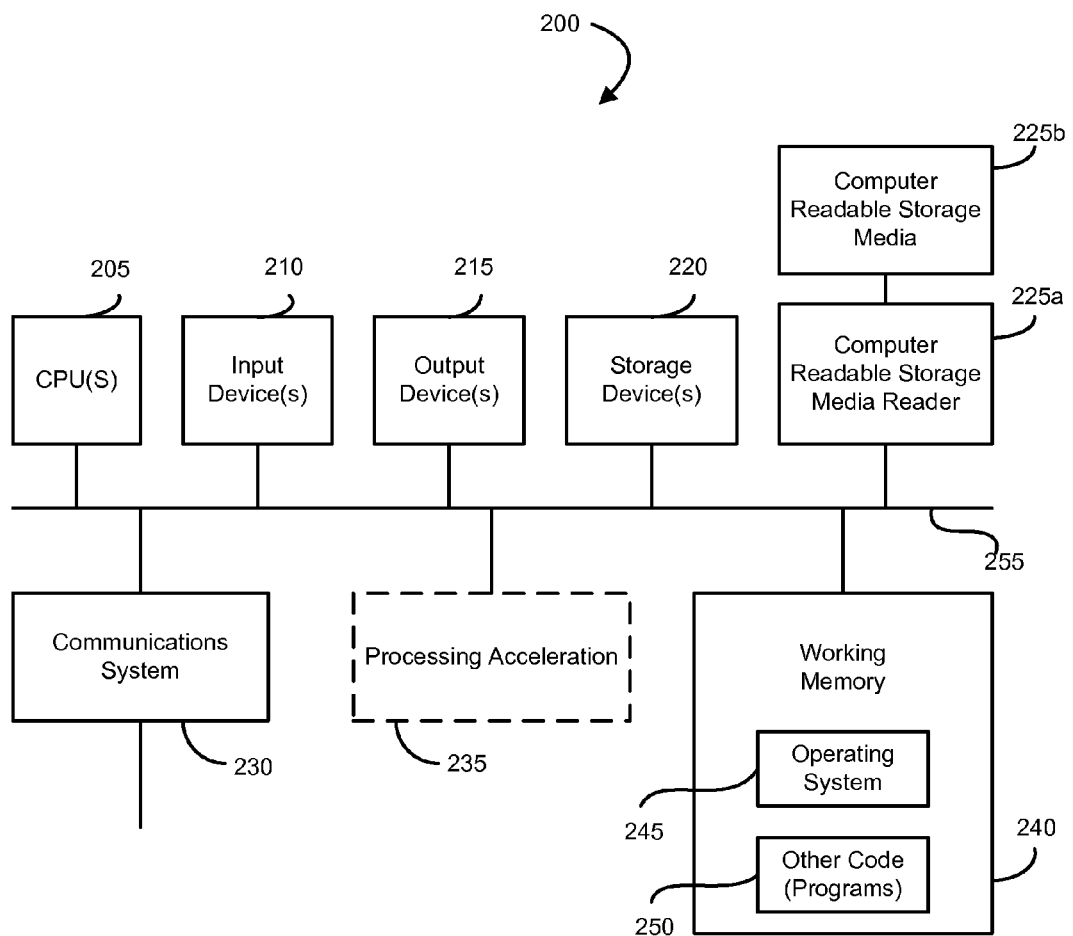
FIG. 2 illustrates a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

The following methods may be implemented by a computer system, such as computer system 200 in FIG. 2. Each step of these methods may be done automatically by the computer system, and/or may be provided as inputs and/or outputs to a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a Web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system.

Figure 3:
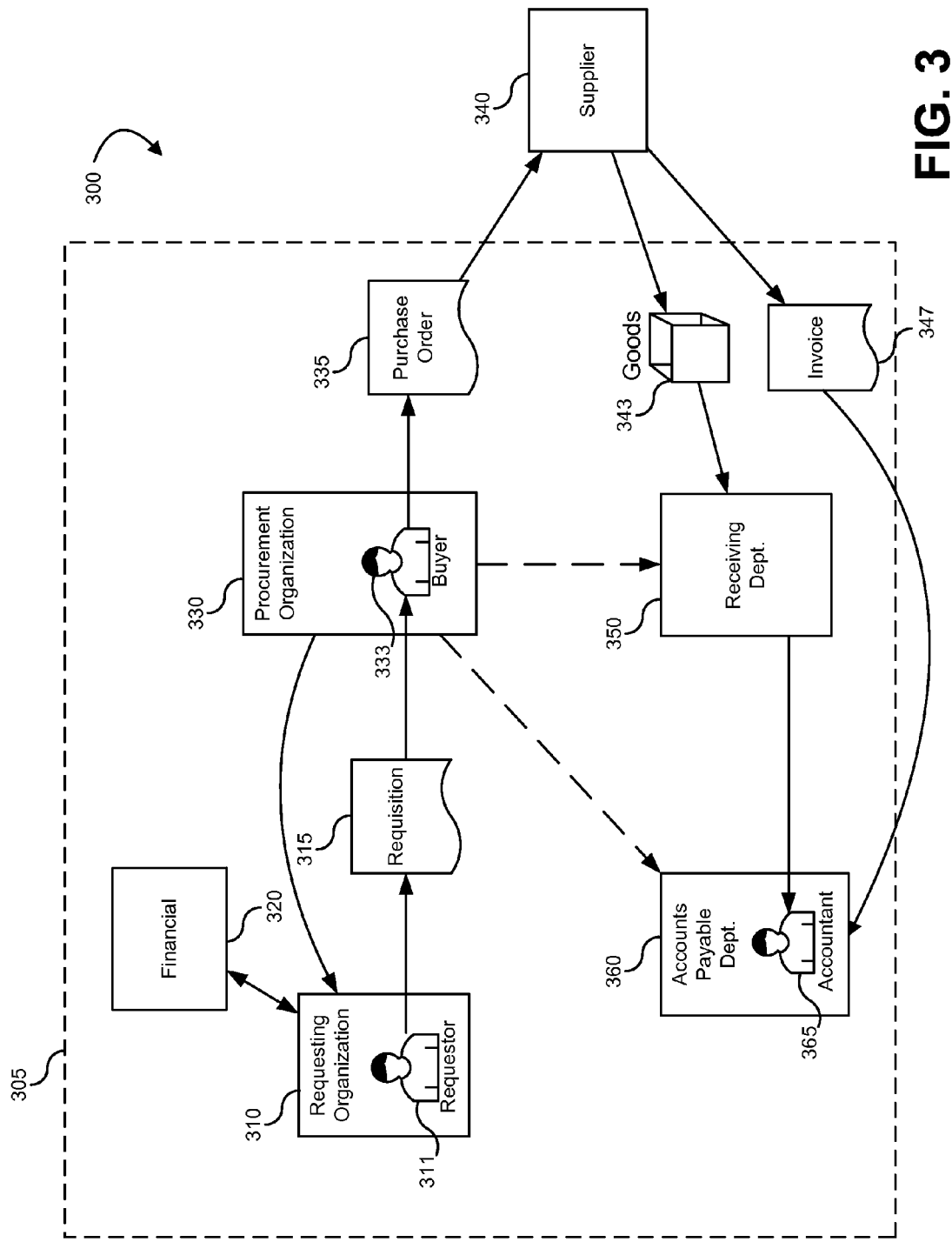
FIG. 3 illustrates a flow diagram of a purchasing process, according to one embodiment.

FIG. 3 illustrates a flow diagram 300 of a purchasing process, according to one embodiment. The process may begin with a requester 311 in a requesting organization 310 attempting to make a purchase. For example a member of a document-processing department may attempt to purchase a new copy machine, which may include the machine itself, along with periodic shipments of toner and other service and maintenance agreements. An enterprise 305 that includes the requesting organization 310 may operate under a budget and require that any purchases be approved by a budgetary authority and/or financial department 320. In one embodiment, the financial department 320 may be comprised of a budgetary department that handles, for example, encumbrance accounting procedures. If a budgetary control system is in operation, then the financial department 320 may accept or reject the purchase based on the current budget and/or known future expenditures.

Generally, a requisition 315 may be considered a formal claim by one or more individuals in the requesting organization 310 to a product or service to be purchased by the procurement organization 330. A requester 311 within the requesting organization 310 may select one or more items and/or services to be purchased using resources of the enterprise 305. The one or more items and/or services may each occupy a single line on the requisition 315. Therefore, the requisition 315 may be made up of a plurality of lines, each line associated with a specific product. Additionally, in some embodiments each line in the requisition 315 may also include a preferred supplier, a cost, alternate items, a recipient, a preferred buyer, an account, a business justification, and expected lifetime, and/or any other information that may be relevant to either the buyer 333 or an approving authority.

In some embodiments, the procurement organization 330 may supply the requesting organization 310 with a catalog of items for which the enterprise 305 may have a financial incentive to purchase. For example, the procurement organization 330 may have a special contractual relationship with a computer supplier, such that cost savings may be realized by purchasing computers exclusively from the computer supplier. Other types of cost savings may also be realized as will be described further herein below. However, when creating the requisition 315, the requester 311 need not be constrained by the catalog. In other embodiments, the requester 311 may not have access to such a catalog at all. In other words, the requester 311 may select any items available for many suppliers and place them on the requisition 315 according to his/her own preference. It then may be the job of the buyer 333 to reconcile items placed on the requisition 315 by the requester 311 with comparable items in the catalog. Therefore, it should be clear that there is a difference between the requisition 315 and the purchase order 335 that is generated by the buyer 333. The requisition 315 generally is not a final representation of items all actually be purchased by the enterprise 305. Instead, the requisition 315 may be viewed as a set of instructions for the buyer 333, according to some embodiments.

The requisition 315 may contain multiple lines associated with a single requester 311. In other embodiments, the requisition 315 may include multiple lines associated with multiple requesters within the requesting organization 310. Such multiple requests from multiple requesters can be aggregated within a single requisition and prepared by a single individual known as the requisition preparer. In yet another embodiment, the requisition 315 may contain multiple lines originating from multiple requesting organizations. According to these embodiments, the requesting organization 310 may be a sub-organization within a larger business unit, such as a department, employee group, and/or the like.

In contrast, some embodiments may not allow requisition lines to be shared between multiple requesting organizations. This may be particularly true when different requesting organizations are separated by legal and financial rules or operating procedures. For example, independent subsidiaries of an enterprise may be subject to independent financial reporting requirements, and thus may be ethically prohibited from intermingling financial transactions. In these cases, security concerns may prevent sharing the requisition 315 between multiple requesting organizations. According to these embodiments, the requesting organization 310 may be defined as an entity that is legally and/or financially separate from other requesting organizations.

Once one or more of the lines on the requisition 315 are completed by the requester 311, the requisition 315 may go through an approval process prior to being sent to the procurement organization 330. In one embodiment, the requisition 315 may need to be approved by an approving authority. The approving authority may be a manager of the requesting organization 310. Alternatively, the approving authority may be a project manager tasked to supervise a project related to the requisition 315. In another embodiment, the approving authority may be a special employee specifically tasked to approve purchases for one or more requesting organizations. This initial approval process may be used to determine whether the items in the lines of the requisition 315 are necessary for the requesting organization 310 and/or any projects to which the requester 311 is tasked. The requester 311 may be required to provide a business justification for each line in the requisition 315. For example, when purchasing a laptop the requester 311 may be required to provide a business justification for purchasing a laptop instead of a comparable desktop computer. The approving authority (manager, project manager, etc.) may then assess the business justification provided by the requester 311 and determine whether the requisition 315 may be approved. In another embodiment, the approving authority may determine whether there is a need within the requesting organization 310 for items in the requisition 315. Because the requisition 315 may be made up of multiple lines, each line may be rejected or approved by the approving authority individually. Thus, if some of the lines are rejected while others are approved, the requisition 315 may be sent to the procurement organization 330 using the approved lines.

After receiving approval from an approving authority, the requisition 315 may also require financial approval. In one embodiment, budgetary controls may be in place such that expenditures on a requisition are only approved if the budget is available. Budgetary approval may be carried out by a computer system of the financial department 320, which may include manual approval by budgetary authority. A budget may be determined to be available based on any number of factors, and may be required to conform to a monthly, weekly, and/or periodic allotment from a year-long budget. In other embodiments, the budgetary approval may also be granted by the approving authority described above. In this case, the approval process may only require a single organization, person, and/or system. For example, an organization's manager may provide all of the necessary approvals.

In addition to budgetary approval, the enterprise 305 may also use encumbrance accounting procedures. In this case, a first budget allocation for a line on a requisition may be made to correspond to an initial cost associated with the requested purchase, along with any other costs required by the encumbrance accounting process. This first allocation of the budget may be recorded as an encumbrance journal entry in an accounting sub-ledger. The accounting sub-ledger may be separate from a general accounting ledger, and may be periodically incorporated into the general accounting ledger.

If the financial department 320 clears the requisition and funds for it are reserved in the encumbrance accounting process, the attempted purchase may result in the requisition 315 from the enterprise 305 being routed to a procurement organization 330. A buyer 333 within the procurement organization 330 may analyze the requisition 315 and determine when, where, and how the corresponding purchase may be made. For example, the buyer 333 may use special corporate contracts to obtain a reduced price on the purchase, or the buyer 333 may use special corporate accounts that provide discounts and/or benefits to the organization. The buyer 333 may generally use any corporate resources available to achieve an optimal price and/or service agreement with a supplier 340.

The buyer 333 may use the requisition 315 to create a purchase order 335. In one embodiment, a purchase order may represent a legal contract between the enterprise 305 and a supplier 340. The procurement organization 330 may insert provisions into the purchase order 335 that allow the procurement organization 330 to final close the purchase order and prevent downstream acceptance, invoicing, and/or other operations to continue.

The purchase order 335 may be sent to the supplier 340, who under the general rules of contract law, may accept or reject the purchase order 335. Upon acceptance, the supplier 340 may send the goods 343 and/or services (not pictured) to a receiving department 350 of the enterprise 305. The supplier 340 may also deliver the goods 343 ordered and send an invoice 347 to the enterprise 305. The goods 343 may be received by the receiving department 350, and invoice 347 may be received by accounts payable department 360. An accountant 365 within the accounts payable department 360 may accept the invoice 347, and match it to the purchase order 335. If the purchase order 335 represents a single delivery/performance, then the accountant 365 may determine a "final match" between the invoice 347, and the purchase order 335. This final match may have the effect of a final close on the purchase order 335.

Additional departments may also be involved in the process of both creating and modifying the requisition 315. If the function of these departments in relation to the requisition 315 plays a part in the requisition process, then these departments may also be notified in the case of changes to the requisition 315 that are approved or denied. These additional departments may be specific to a particular organization and/or may be commonly used by many organizations. Although not specified here for brevity, they may be treated in a similar manner as the other departments described in FIG. 3.

Figure 4:
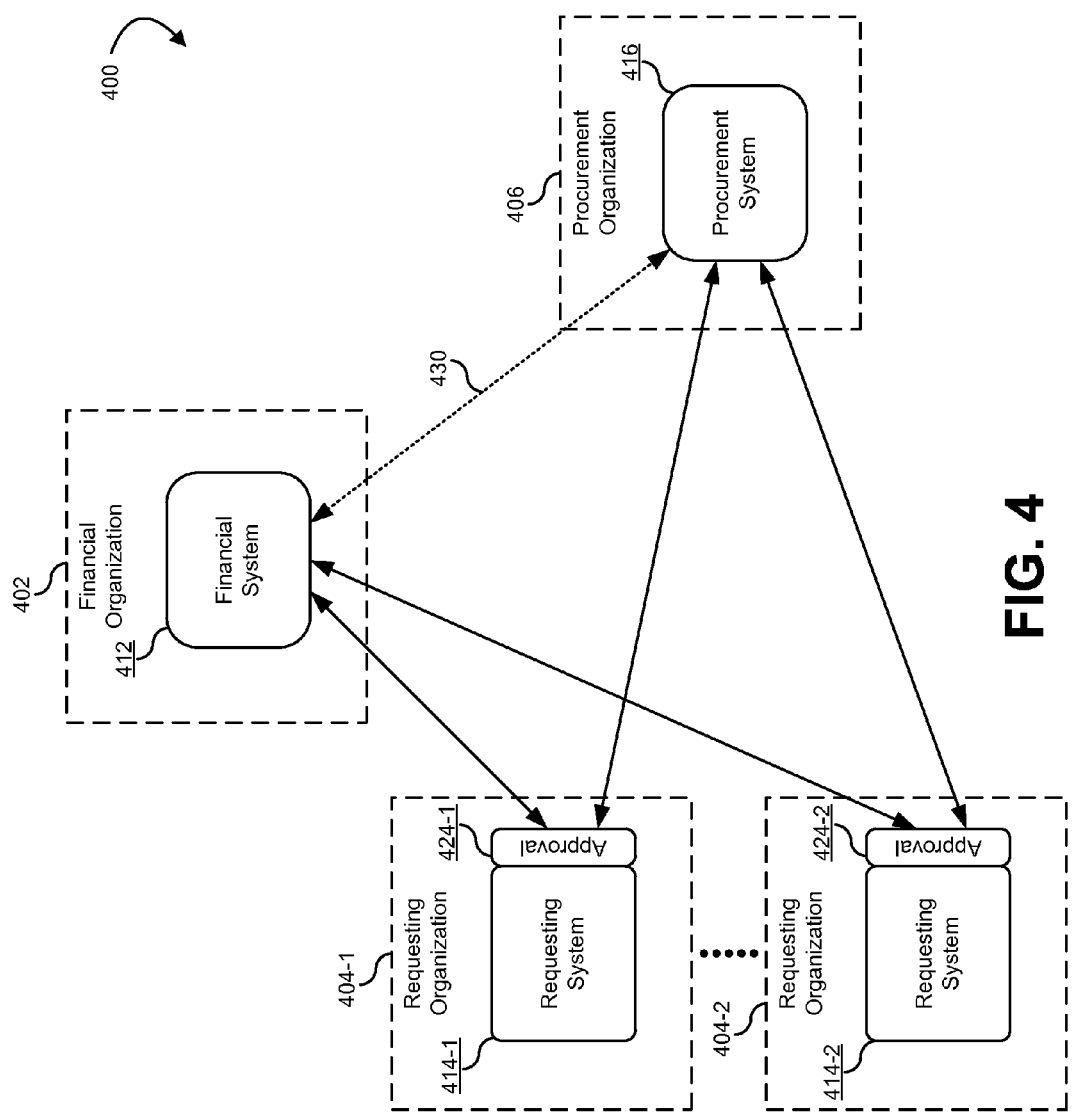
FIG. 4 illustrates a block diagram of a system for allowing a buyer to modify a requisition, according to one embodiment.

FIG. 4 illustrates a block diagram 400 of a system for allowing a buyer to modify a requisition, according to one embodiment. One or more requesting organizations 404 may create a requisition containing items and/or services required for various projects, operations, and/or the like. Each of the requesting organizations 404 may include a computer system configured to receive inputs from which a requisition may be created. For example, one or more requesting systems 414 may be used by each of the requesting organizations 404. Each of the requesting systems 414 may also be referred to as computer systems of a requesting organization. It will be understood that a single requesting system 414-1 may be used for one, more than one, or all of the requesting organizations. In one embodiment, the requesting systems 414 may provide a web-based interface by which members of the requesting organizations 404 may enter items to be included in a requisition. In one embodiment, the requesting systems 414 may be implemented by an enterprise software package, such as the Oracle® Self-Service Procurement product.

Each of the requesting organizations 404 may include an approval authority 424. Each approval authority 424 may be tasked to approve any or all requisitions from its corresponding requesting organization. In one embodiment, an approval authority 424 may be shared between the number of requesting organizations 404, while in another embodiment, each of the requesting organizations 404 may have a dedicated approval authority 424. In one embodiment, each approval authority 424 may use a computer system specific to its task. Alternatively, each approval authority 424 may use an interface in the requesting systems 414. It will be understood that just as an approval authority 424 may be shared amongst requesting organizations 404, a single requisition may include lines and approvals from multiple requesting organizations 404 and approval authorities 424.

In addition to receiving approval from an approval authority 424, the requisition may also be passed to a financial organization 402 for budgetary approval. The financial organization may be a budgetary control organization, and may use a special financial system 412. This may also be referred to as a computer system of a financial organization. The financial organization 402 may provide at least two different functions. First, if budgetary controls are in place, it may analyze expenditures listed in a requisition to determine whether the budget can accommodate the requests. Second, if encumbrance accounting controls are in place, the financial system 412 may allocate funds in an accounting system that correspond to the expenditures in the requisition. Encumbrance accounting may be particularly common among public-sector organizations that use public money. Encumbrance accounting procedures may require that expenditures be recorded in a subledger as a pre-encumbrance before the items are received, invoiced, and/or paid for. In one embodiment, the financial system 412 may be implemented by an enterprise software product, such as the Oracle® Financials product. Thus, a financial organization 402 may be conceptually divided between actual accounting (based on actual expenditures and generally accepted accounting practices) and encumbrance accounting (based on future expenditures that are recorded to comply with government regulations).

In one embodiment, either the requesting systems 414 or the financial system 412 may set a threshold that defines the type of changes that may be made by a buyer without additional approval. In some cases, each requesting organization may set its own thresholds to be applied to requisitions originating from that department. The threshold may be system-wide, such that every requisition uses the same threshold. Alternatively, each requisition may receive its own threshold. In this case, default threshold may be applied to any requisitions for which a particular threshold is not specified that originate from that requesting organization. For example, a default, system-wide threshold may represent a change in the absolute value of the cost of a requisition. One particular requisition may include a single high-value item such as an oscilloscope costing around $100,000. The default threshold representing the change in the absolute value of the cost may be applied to all of the lines in the requisition except that of the oscilloscope, which may have its own threshold. For a high-value item, the threshold may be a percent change, such as 5%, 10%, or 15%. Alternatively, the threshold for high-value item may be such that any change from the specified item and cost will not be allowed by the buyer without approval, thus violating the threshold. Such thresholds can either be presented as a user interface configuration in the software system, such as setup pages, or as a more dynamic and flexible rule-based mechanism.

Generally, the threshold scenarios described above, and many other types of scenarios, may be captured in a rule-based system allows for maximum flexibility. In other words, logical rules can be established to govern nearly any behavior required in response to characteristics of one or more requisition lines. Thus, expression-based rules may be created using characteristics of a requisition line as input, and whether or not a re-approval process is required as an output. For example, multiple logical expressions may be used to describe percentage change thresholds, absolute change thresholds, thresholds based on item cost, and/or the like. The approval rules for the requisition may expose attributes such as a change tolerance. Approval rules can then be customized to make use of such attributes and assign them appropriate values. The approval rule may be modified to say that if the change in the requisition line amount exceeds a threshold percentage, such as 10% of the original requisition line amount; such requisitions may be redirected through a hierarchy of approvals.

In one embodiment, the financial organization 402 and the requesting organizations 404 may each set their own thresholds. For example, the financial organization 402 may set thresholds related to cost, accounts charged, tax categories, capital asset classification, and/or the like. Similarly, the requesting organizations may set thresholds related to supplier, brand, performance characteristics, operating systems, compatibility with other equipment, and/or the like. Therefore, a single requisition may be subject to a number of different thresholds. Each line in a requisition may also be subject to a default threshold from one or more departments. Additionally, each line in a requisition may be subject to thresholds that have been defined and/or applied to each particular line. In one embodiment, configurations may be used to determine whether a buyer can make a change at all without approval, regardless of any thresholds. This may be described as more of an on/off switch compared to the more fine-grained control allowed via tolerances/thresholds. Here, any changes made by a buyer would require approval. In other embodiments, a threshold may be used to determine whether a buyer is allowed to make a change without resubmitting the requisition to the approval process described above. It will be understood that the on/off switch configuration is separate from threshold evaluation. The on/off configuration allows customers to turn off the threshold evaluation feature completely, and may be useful for customers of an existing software product that do not wish to enforce the re-approval process for buyer initiated changes.

After passing through the approval process, the requisition may be sent to a procurement organization 406. Depending on the order of the approval process, the requisition may be sent from the requesting systems 414, the approval authority 424, and/or the financial system 412. In one embodiment, the various approvals may be done in any order and returned to the requesting organizations 404 before they are sent to the procurement organization 406. In another embodiment, the computer systems of the requesting organizations 404 may automatically send a requisition to a computer system of the procurement organization after approvals have been granted. In one embodiment, the computer system of the procurement organization may be referred to as a procurement system 416. The procurement system 416 may be implemented by an enterprise software package, such as the Oracle Purchasing product.

In one embodiment, the job of a buyer in the procurement organization 406 may include translating lines on a requisition into one or more purchase orders. As mentioned earlier, requesters in the requesting organizations 404 may not be aware, or may choose to ignore, special purchasing relationships that the procurement organization 406 may have with a number of suppliers. For example, the procurement organization 406 may be able to arrange advantageous pricing for bulk orders based on a certain quantity. Therefore, the procurement organization may group a number of requisitions together in order to produce a single purchase order of the number of units required for the discount. As another example, the procurement organization 406 may have special price arrangements with certain vendors. Therefore, the procurement organization 406 may change an item ordered from one supplier to a comparable item ordered from another supplier with whom cost savings may be arranged. In yet another example, the procurement organization 406 may be required to examine a number of alternatives and select the most cost-efficient supplier. This may be particularly true in government organizations where a least-expensive alternatives policy may be enforced. In another example, the procurement organization 406 may be aware of a contractual obligation on behalf of the enterprise to purchase products from one supplier as opposed to others. Therefore, the procurement organization 406 may change an item ordered from an unapproved supplier to the comparable item ordered from the contractually-obligated supplier. In another example, the procurement organization 406 may work in conjunction with a reclamation department to determine that an item on a requisition may already be available for use within the enterprise. Therefore, the line on the requisition may be removed, and the requester may be directed to the reclamation department for the item.

Because each of the examples described above may be best understood by the procurement organization 406, a buyer within the procurement organization 406 will usually be called upon to process the lines of a requisition into one or more purchase orders correctly. This may be done on an interface provided by the procurement system 416. In one embodiment, the procurement system 416 is separate from the requesting systems 414. In another embodiment, the requesting systems 414 may use a software package that is integrated with the software package used by the procurement system 416.

The procurement system 416 may automatically compare any changes to the requisition made by a buyer in the procurement organization 406 to one or more thresholds that are previously defined and associated with the requisition. For thresholds that determine whether changes are allowed without additional approval, buyer-initiated changes that violate thresholds may signal that additional approvals are needed. A message, or indication, may be provided to the buyer in the procurement organization 406. Additionally, indications may be provided to the requesting organizations 404, the original requester, and/or the financial organization 402. For thresholds that determine whether changes are allowed at all, any buyer-initiated changes may either be prevented, or sent back for additional approvals.

When changes are made to a requisition by buyer that violate one or more thresholds, the requisition with the changes may be resubmitted to the approval process described earlier. In some embodiments, the requisition with the changed lines may be resubmitted in the same manner as it was originally submitted. Therefore, the changes may be submitted to the approval authorities 424, the financial organization 402, and any other parties that the approved the requisition before it was sent to the procurement organization 406. In one embodiment, only the lines with changes that violated thresholds are sent back for re-approval. In another embodiment, if the changes to any lines in a requisition violated a threshold, then the entire requisition may be resubmitted for approval. This may occur in situations where some lines in a requisition depend upon other lines, or where some purchases were made under the assumption that other purchases also be made. For example, changing a line associated with the new computer system may violate a threshold, while changing a line related to software for the computer system may not violate a threshold. However, because the software depends on the type of computer system purchased, both lines may need to be submitted for review and approval.

In one embodiment, the requisition may be returned to organizations that are responsible for the threshold that is violated. In other words, the receiving organization/system may be determined by the source of the violated threshold. For example, if the cost threshold set by the financial organization 402 was violated, then the changed lines in the requisition may need only to be submitted to the financial organization 402, and not to the requesting organizations 404. As another example, if a supplier threshold set by the requesting organizations 404 is violated by a changed line in a requisition, then only be requesting organizations 404 may need to approve the change. In another embodiment, any change violating a threshold may require that each organization involved in the approval process reapprove the changed requisition.

During the reapproval process, each approving organization may approve or deny the changes made to the requisition. If only some of the lines in the requisition violate a threshold, and others were either unchanged and/or did not violate a threshold, the only the changed lines need to be examined and approved by each approving organization. In one embodiment, the approving organization may reject the change to the requisition, yet replace the change with another requisition line for different product, cost, supplier, etc. This modification replacing the original change may then be sent to the procurement organization 406 and the process may begin again from that point. At the same time a notification may be sent to the buyer initiating the change to apprise the buyer of the approval, rejection, or modification. Approved changes may be forwarded to the procurement organization 406, where a corresponding purchase order may then be generated and sent to suppliers.

In one embodiment, the various modules and systems in FIG. 4 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Figure 5:
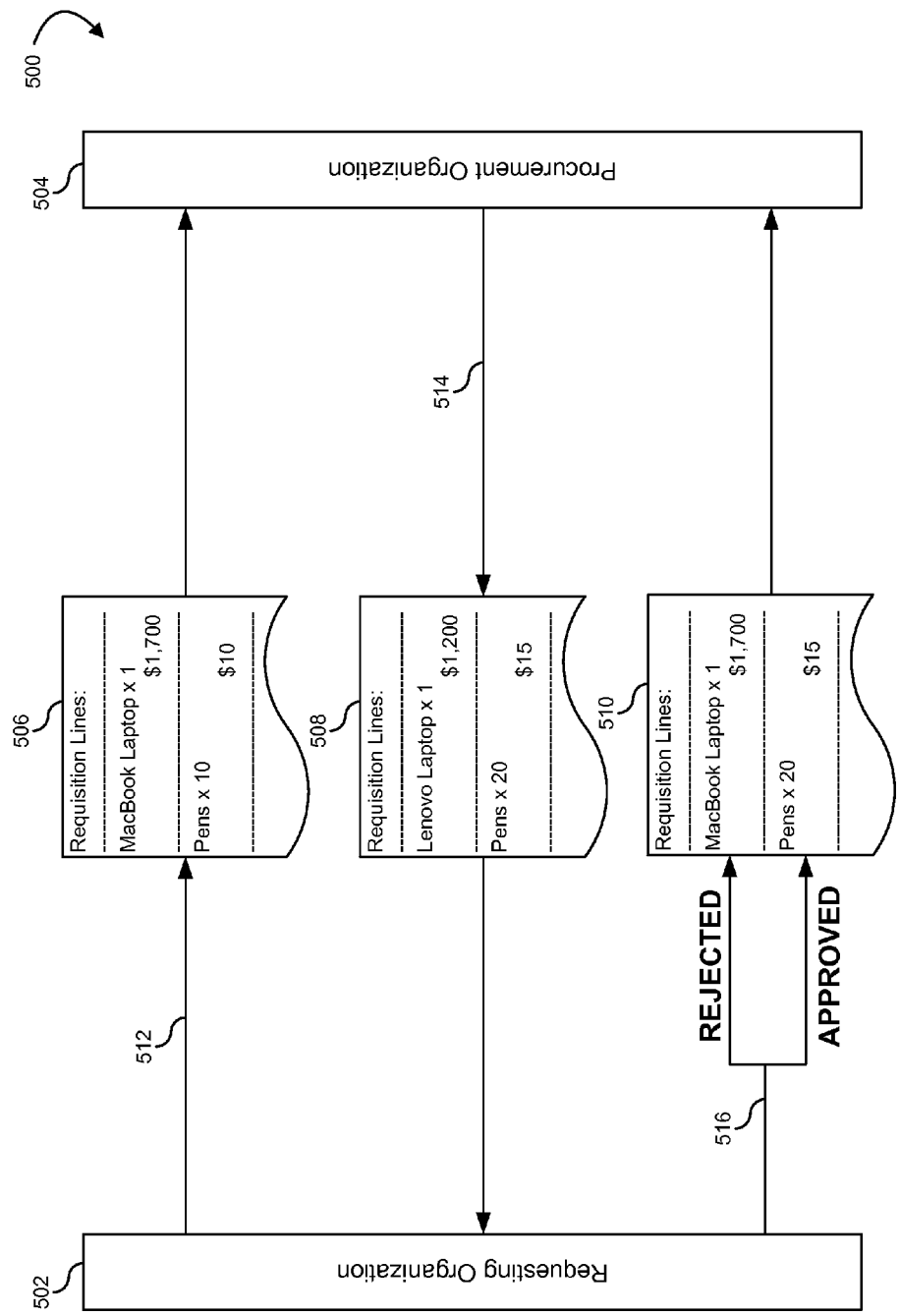
FIG. 5 illustrates an example of a requisition that is changed and resubmitted to the approval process, according to one embodiment.

FIG. 5 illustrates an example of a requisition that is changed and resubmitted to the approval process, according to one embodiment. In this example, the requesting organization 502 may generate a requisition 506 and send it to the procurement organization 504 (512). The requisition includes at least two lines. The first line is associated with an order for a laptop computer. Specifically, a single MacBook® laptop is ordered at a cost of $1700. The second line is associated with an order for pens. Specifically, ten pens have been ordered at a total cost of $10. The requester in the requesting organization 502 who created these lines in the requisition 506 may have chosen these items according to personal preference, without consulting any preferred items and/or suppliers recognized by the enterprise. Note that each line may include additional information, such as a supplier, website, shipping preference, and/or the like. These options are not shown in FIG. 5 for brevity.

When the procurement organization 504 receives the requisition 506, the buyer may examine each line of the requisition to determine whether each of the lines may be modified in order to provide a financial benefit to the enterprise. In this example, the buyer in the procurement organization 504 may determine that a different supplier of laptop computers may offer more cost savings for a comparable laptop. Specifically, the MacBook® laptop may be replaced by a Lenovo® laptop in order to save money, honor a contract with a certain supplier, bundle orders together into a bulk order, and/or the like. Additionally, the buyer in the procurement organization 504 may determine that the quantity of pens needs to change to realize additional cost savings. Specifically, it may be determined that doubling the quantity of pens will result in a more financially advantageous cost per unit. In one embodiment, this be can accomplished by splitting the requisition line for quantity 10 into two requisition lines for a quantity of 10 on each.

These changes may be made by a computer system of the procurement organization, and the changed requisition 508 may be sent back to the requesting organization 502 (514). Although not shown in FIG. 5, the changed requisition 508 may also require additional funds to be reserved from by the budgetary control department. In this, case, the changes may be sent back to a financial organization in order to approve changes that violate a threshold that were set by the financial organization. In this example, a first threshold may relate to policies set forth by the requesting organization based on the particular computer supplier. Specifically, if a buyer is going to change the source of the computer ordered by requesting organization 502, then this may require approval from the requesting organization 502. Additionally, this example may include a threshold related to item quantities. Specifically, the requesting organization may set a limit on the number of office supplies that are ordered. For instance, the requesting organization 502 may require approval for the additional pens that are ordered because the requesting organization 502 may keep an inventory that may already have sufficient pens. Note that there may be cost thresholds, along with other thresholds, that may or may not be violated by this example. However, only these two thresholds are described here for brevity.

When the requesting organization 502 receives the changed requisition 508, the requesting organization 502 may approve, reject, and/or modify the changes made by the procurement organization 504. In this example, the requesting organization 502 may reject the change made to the laptop order. The requesting organization 502 may have had a specific reason for ordering a particular laptop, such as compatibility with existing software, preference of the user, and/or the like. On the other hand, the requesting organization 502 may approve the change made to the pen order. Here, the requesting organization 502 may determine that an increased quantity of pens will not exceed a desired level of inventory.

Almost any change made to any requisition may change the cost of one or more lines in the requisition. One of the main motivations behind requiring additional approval may be determining whether a change in the cost due to the change in the requisition will cause a change in the budget allocations or determinations or previously made. For example, if budgetary controls are in place, then an increase in the cost of the requisition may exceed the original budget estimate. Therefore, most changes should be approved from a financial or budgetary control perspective. Also, if encumbrance accounting procedures are used, then additional entries may need to be made to a subledger as a pre-encumbrance in order to comply with such procedures.

In this example, costs have been changed. However the cost associated with the laptop purchase in the changed requisition 508 actually reduced the cost. In some embodiments a reduced cost would not require a budgetary approval. In embodiments where encumbrance accounting procedures are in force, even reductions in cost may require additional entries to be made in a subledger such that the pre-allocated funds are correct. Also in this example, the change to the pen order did result in an increased cost from $10 to $15. In this case, a threshold may be used to determine that no additional budgetary authorization is required because the cost difference is only $5. However, in other examples the threshold may be lower, or the change in price may be higher, such that the change in cost would require budgetary approval. Again, regardless of whether a threshold is violated, and regardless of whether the cost increased or decreased, the change may be recorded in an accounting subledger in accordance with encumbrance accounting procedures.

After the changes are rejected and/or approved, a reviewed requisition 510 may be sent back to the procurement organization 504 (516). In one embodiment, when the procurement organization 504 receives the reviewed requisition 510, the entire process may begin again. For example, the procurement organization 504 may review the modifications and/or rejections made in the reviewed requisition 510 and make subsequent changes that are then sent back to the requesting organization 502 for review and approval. For example, the procurement organization 504 may determine that the laptop selection is unacceptable according to purchasing guidelines established by the enterprise. This change may be sent back to the requesting organization 502, with an accompanying explanation as to why such a purchase is not recommended.

In one embodiment, all or part of the change, review, and approval process may be automated by a computer system of the respective organizations. In one embodiment, the entire process may be completely automated, such that thresholds used in decisions may be made in an automated fashion without requiring human interaction. In another embodiment, the decision as to whether additional approval is required may be automated while the actual review and approval may require manual interaction.

Figure 6:
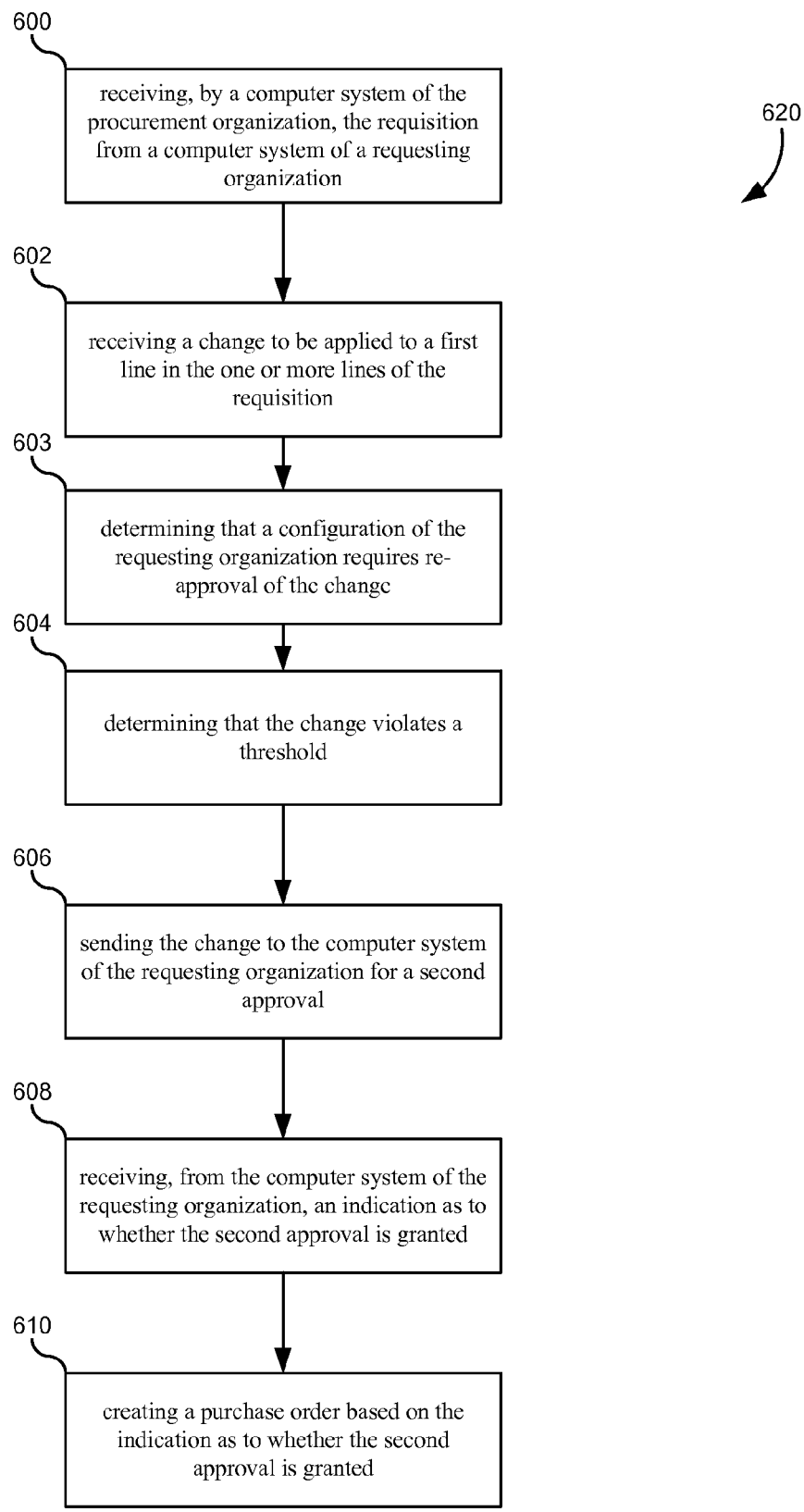
FIG. 6 illustrates a flowchart of a method of modifying a requisition within approval and budgetary constraints by a procurement organization, according to one embodiment.

FIG. 6 illustrates a flowchart 620 of a method of modifying a requisition within approval and budgetary constraints by a procurement organization, according to one embodiment. The method may include receiving, by a computer system of the procurement organization, the requisition from a computer system of a requesting organization (600). This and the other steps in the method of flowchart 620 may be carried out by the computer system of a procurement organization. In one embodiment, the requisition may comprise one or more lines, where each of the one or more lines has been approved by the requesting organization. In some embodiments, the one or more lines may originate from a plurality of requesting organizations, and may have been approved by a plurality of approving authorities, such as the financial organization, the manager, and/or the like.

The method may also include receiving a change to be applied to a first line in the one or more lines (602). In one embodiment, the first line may be associated with a first budget allocation. The first budget allocation may be a cost associated with an item to be purchased according to the first line in the requisition. The cost may be approved according to budgetary controls, and may be recorded in a subledger according to encumbrance accounting procedures. In another embodiment, the change is received from a buyer in the procurement organization, and the change is associated with a second budget allocation that is different than the first budget allocation. The change made by the buyer may affect the quantity, cost, supplier, brand, charging account, etc. according to the original requisition.

Generally, an organization may choose at least two options to govern how modifications approvals should be handled. First, an organization may choose to use thresholds to distinguish between modifications that require re-approval and modifications that may be allowed without re-approval. Second, an organization may use a configuration in the software system to govern whether any modifications may be submitted for re-approval at all. Certain organizations may never want buyer modifications to be reapproved. On the other hand, some organizations may always want modifications to be reapproved. In a sense, this configuration may be viewed as a binary option, or a threshold having either a zero or infinite value, where the threshold is either always violated or never violated. In one embodiment, the method may include one or both of these options. Thus, the method may include determining that a configuration of the requesting organization requires re-approval of the change (603).

The method may additionally include determining that the change violates a threshold (604). In one embodiment, the threshold may be set by the requesting organization, and may be provided by the computer system of the requesting organization. Like the change to the requisition, the threshold may be associated with the quantity, cost, supplier, brand, charging account, and/or the like. As used herein, the phrase "violates a threshold" may include violating a threshold in scalar terms, such as a cost that is greater than the threshold, or a quantity that is less than the threshold. Additionally, this phrase may include violating a binary condition, such as when a threshold or configuration is used to determine whether a change may be made at all. Further, the phrase may mean violating a restriction on a non-scalar quantity such as a brand or supplier. For instance, a threshold may be violated by choosing a brand outside of the designated group of brands approved by the enterprise. Also, a threshold may be violated by charging an account that is outside the group of approved accounts. In one sense, "violating a threshold" may include figuratively crossing a boundary between an approved group of values and an unapproved group of values.

The method may further include sending the change to the computer system of the requesting organization for a second approval (606). Additionally or alternatively, the method may include sending the change to the computer system of a financial department if budgetary controls are in place, and/or thresholds established by a financial organization have been violated. In one embodiment, the change may be sent between the computer systems of the respective organizations in an automated fashion without requiring manual interaction.

The method may also include receiving, from the computer system of the requesting organization, an indication or notification as to whether the second approval is granted (608). The indication may be sent back to the initiator of the changes, which in this case may be the buyer. A change may be classified as a rejection may be considered the final state of the requisition line, while a modification may be considered an opportunity for the procurement organization to make subsequent recommendations and/or changes. It will be understood that multiple thresholds may be violated, and the single-line may be approved as to some thresholds and rejected as to others. In one embodiment, a single rejection according to one threshold may cause the final state of the line to be considered rejected, notwithstanding other threshold violations that were allowed.

The method may additionally include creating a purchase order based on the indication as to whether the second approval is granted (610). In another embodiment, an additional change may be received by the computer system of the procurement organization, and the method may again determine whether the threshold is violated and whether additional approvals may be necessary (604). If all changes have been finalized in the requisition, a purchase order may be created from the requisition according to the policies of the procurement department. In one embodiment, the purchase order may represent a legally binding commitment to purchase items from a named supplier.

In the foregoing example described in flowchart 620, reference is made to a first line, a first budget allocation, a second budget allocation, and/or the like. It will be understood that although this example includes reference only a single instance of one or more of these elements, that other elements are also contemplated. For example, a plurality of lines in the requisition may be selected and changed. Multiple lines may violate multiple thresholds. The change may be sent to multiple computer systems corresponding to multiple requesting organizations. Also, approvals may be received from other organizations in addition to the requesting organization.

Figure 7:
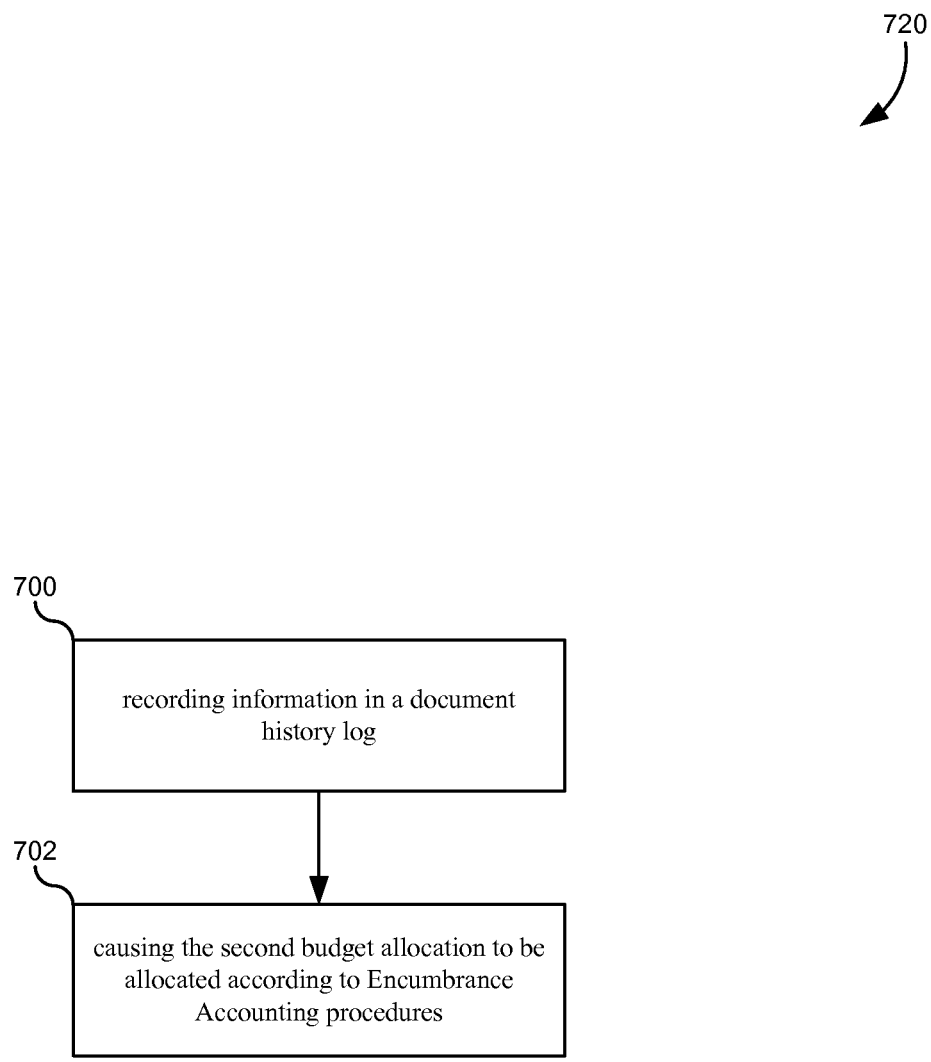
FIG. 7 illustrates a flowchart of additional methods of modifying a requisition within approval and budgetary constraints by a procurement organization, according to one embodiment.

FIG. 7 illustrates a flowchart 720 of additional methods of modifying a requisition within approval and budgetary constraints by a procurement organization, according to one embodiment. Each of the steps in FIG. 7 may be applied independently or in combination with other steps as described in FIG. 6. In some embodiments, the steps from flowchart 720 may be intermingled within flowchart 620. The method may include recording information in a document history log (700). In one embodiment, the information may include the first budget allocation, the second budget allocation, and the indication as to whether the change is approved. The document history log may be used to provide legally required records for encumbrance accounting, and/or financial accounting reports. The document history log may be kept in a database. In one embodiment, the information may be written to the database regardless of the outcome of the approval process. The information may also include other information regarding the transaction, such as a name or user ID of the buyer, a name or user ID of the requesting party, a requesting organization designator, a date, transaction times, and/or any other information associated with the transaction.

The method may also include causing to be allocated, in a computer system of a financial department, the second budget allocation according to encumbrance accounting procedures (702). As discussed above, changes in the cost of a requisition, whether they represent an increase or decrease, may affect and amount of funds that have been pre-allocated according to encumbrance accounting procedures. In embodiments where these procedures are in force, changes should be written to a subledger associated with encumbrance accounting. In one embodiment, cost changes below a certain threshold need not be recorded in the subledger, while in another embodiment, all cost changes are recorded.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of modifying, within approval and budgetary constraints, a requisition by a procurement organization, the method comprising:
   receiving, by a computer system of the procurement organization, the requisition from a relational database of a requesting organization, wherein:
      the requisition comprises one or more lines;
      each of the one or more lines has been approved by the requesting organization;
   receiving, by the computer system of the procurement organization, SQL commands that generate a change to be applied to a first line in the one or more lines in a relational database of the procurement organization, wherein:
      the first line is associated with a first budget allocation;
      the change is received from a buyer in the procurement organization;
      the change is associated with a second budget allocation that is different than the first budget allocation;
   determining, by the computer system of the procurement organization, whether the change violates a threshold, wherein the threshold allows some changes to be made to the requisition without additional approvals;
   if the change violates the threshold:
      sending, by the computer system of the procurement organization, the change to the computer system of the requesting organization for a second approval;
      receiving, by the computer system of the procurement organization, from the computer system of the requesting organization, an indication as to whether the second approval is granted; and
      creating SQL commands, by the computer system of the procurement organization, for the relational database of the procurement organization that generate a purchase order based on the indication as to whether the second approval is granted; and if the change does not violate the threshold:
      creating SQL commands, by the computer system of the procurement organization, for the relational database of the procurement organization that generate a purchase order based on the change.

2. The method of claim 1, wherein:
   the indication as to whether the second approval is granted indicates that the second approval is not granted; and
   the purchase order includes at least one of the one or more lines that are not affected by the change.

3. The method of claim 1, further comprising:
   recording, by the computer system of the procurement organization, and in a document history log, information comprising:
      the first budget allocation;
      the second budget allocation; and
      the indication as to whether the change is approved.

4. The method of claim 1, further comprising:
   causing to be allocated, by the computer system of the procurement organization, and in a computer system of a financial department, the second budget allocation according to encumbrance accounting procedures.

5. The method of claim 1, wherein the change is approved based on:
   an approval from a member of the requesting organization who requested the first line; and
   an approval from an authority that originally approved the first line.

6. The method of claim 1, wherein the threshold comprises a maximum cost increase between the first budget allocation and the second budget allocation.

7. The method of claim 1, wherein the threshold comprises a type of product for purchase associated with the first line.

8. The method of claim 1, wherein the change comprises substituting a comparable product for a product specified by the first line.

9. The method of claim 1, wherein the change comprises adjusting a quantity of products associated with the first line.

10. The method of claim 1, wherein the change comprises changing a supplier associated with the first line.

11. The method of claim 1, wherein the threshold is received from the computer system of the requesting organization.

12. The method of claim 1, wherein the computer system of the requesting organization is separate from the computer system of the procurement organization.

13. The method of claim 1, further comprising:
   accessing, by the computer system of the procurement organization, a configuration; and
   determining, by the computer system of the procurement organization, and according to the configuration, whether the change should be allowed.

14. A non-transitory computer-readable memory having stored thereon a sequence of instructions which, when executed by one or more processors, causes the one or more processors to modify, within approval and budgetary constraints, a requisition by a procurement organization by:
   receiving, by a computer system of the procurement organization, the requisition from a relational database of a requesting organization, wherein:
      the requisition comprises one or more lines;
      each of the one or more lines has been approved by the requesting organization;
   receiving, by the computer system of the procurement organization, SQL commands that generate a change to be applied to a first line in the one or more lines in a relational database of the procurement organization, wherein:
      the first line is associated with a first budget allocation;
      the change is received from a buyer in the procurement organization;

the change is associated with a second budget allocation that is different than the first budget allocation;
determining, by the computer system of the procurement organization, whether the change violates a threshold, wherein the threshold allows some changes to be made to the requisition without additional approvals;
if the change violates the threshold:
sending, by the computer system of the procurement organization, the change to the computer system of the requesting organization for a second approval;
receiving, by the computer system of the procurement organization, from the computer system of the requesting organization, an indication as to whether the second approval is granted; and
creating SQL commands, by the computer system of the procurement organization, for the relational database of the procurement organization that generate a purchase order based on the indication as to whether the second approval is granted; and if the change does not violate the threshold:
creating SQL commands, by the computer system of the procurement organization, for the relational database of the procurement organization that generate a purchase order based on the change.

15. The non-transitory computer-readable memory according to claim 14, wherein the instructions further cause the one or more processors to modify a requisition within approval and budgetary constraints by a procurement organization by:
recording, in a document history log, information comprising:
the first budget allocation;
the second budget allocation; and
the indication as to whether the change is approved; and
causing to be allocated, in a computer system of a financial department, the second budget allocation according to encumbrance accounting procedures.

16. The non-transitory computer-readable memory according to claim 14, wherein:
an approval from a member of the requesting organization who requested the first line;
an approval from an authority that originally approved the first line; and
the threshold comprises a maximum cost increase between the first budget allocation and the second budget allocation.

17. The non-transitory computer-readable memory according to claim 14, wherein the change comprises substituting a comparable product for a product specified by the first line.

18. The non-transitory computer-readable memory according to claim 14, wherein the change comprises adjusting a quantity of products associated with the first line.

19. A system comprising:
one or more processors; and
a memory communicatively coupled with and readable by the one or more processors and having stored therein a sequence of instructions which, when executed by the one or more processors, cause the one or more processors to modify, within approval and budgetary constraints, a requisition by a procurement organization by:
receiving, by a computer system of the procurement organization, the requisition from a relational database of a requesting organization, wherein:
the requisition comprises one or more lines;
each of the one or more lines has been approved by the requesting organization;
receiving, by the computer system of the procurement organization, SQL commands that generate a change to be applied to a first line in the one or more lines in a relational database of the procurement organization, wherein:
the first line is associated with a first budget allocation;
the change is received from a buyer in the procurement organization;
the change is associated with a second budget allocation that is different than the first budget allocation;
determining, by the computer system of the procurement organization, whether the change violates a threshold, wherein the threshold allows some changes to be made to the requisition without additional approvals;
if the change violates the threshold:
sending, by the computer system of the procurement organization, the change to the computer system of the requesting organization for a second approval;
receiving, by the computer system of the procurement organization, from the computer system of the requesting organization, an indication as to whether the second approval is granted; and
creating SQL commands for the relational database of the procurement organization that generate a purchase order based on the indication as to whether the second approval is granted; and
if the change does not violate the threshold:
creating SQL commands for the relational database of the procurement organization that generate a purchase order based on the change.

20. A system comprising:
one or more processors; and
a memory communicatively coupled with and readable by the one or more processors and having stored therein a sequence of instructions which, when executed by the one or more processors, cause the one or more processors to modify, within approval and budgetary constraints, a requisition by a procurement organization by:
receiving, by a computer system of the procurement organization, the requisition from a relational database of a requesting organization, wherein:
the requisition comprises one or more lines;
each of the one or more lines has been approved by the requesting organization;
receiving, by the computer system of the procurement organization, SQL commands that generate a change to be applied to a first line in the one or more lines in a relational database of the procurement organization, wherein:
the first line is associated with a first budget allocation;
the change is received from a buyer in the procurement organization;
the change is associated with a second budget allocation that is different than the first budget allocation;
determining, by the computer system of the procurement organization, whether the change violates a threshold, wherein the threshold allows some changes to be made to the requisition without additional approvals;
if the change violates the threshold:
sending, by the computer system of the procurement organization, the change to the computer system of the requesting organization for a second approval;
receiving, by the computer system of the procurement organization, from the computer system of the requesting organization, an indication as to whether the second approval is granted; and creating SQL commands, by the computer system of the procurement organization, for the relational database of the procurement organization that generate a purchase order based on the indication as to whether the second approval is granted; and if the change does not violate the threshold:

creating SQL commands, by the computer system of the procurement organization, for the relational database of the procurement organization that generate a purchase order based on the change.

\* \* \* \* \*